UNITED STATES PATENT OFFICE.

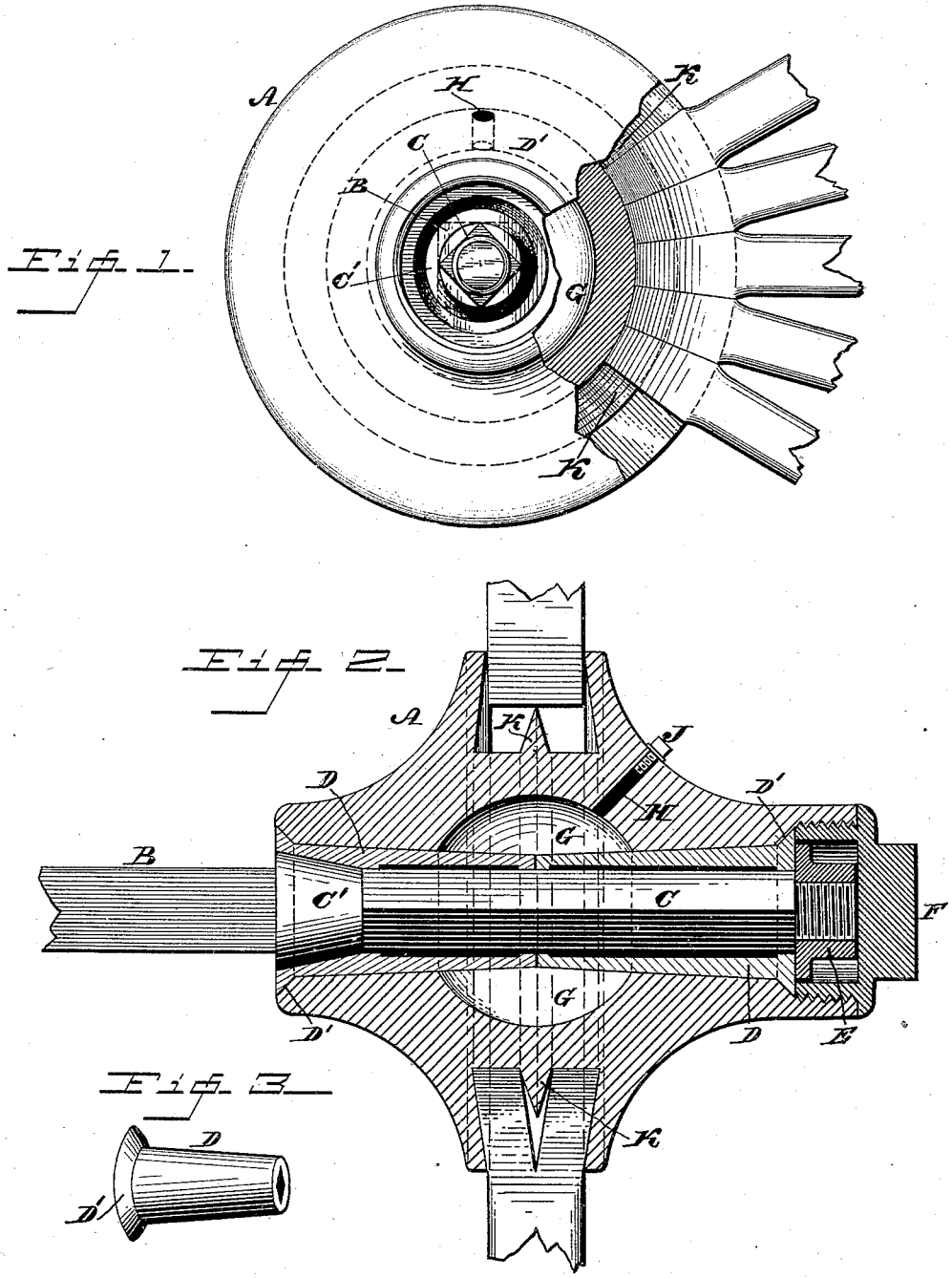

JOHN P. SPICER, OF DARBY, ASSIGNOR OF TWO-THIRDS TO WILLIAM H. SMYTH AND JOHN N. CARPENTER, OF PHILADELPHIA, PENNSYLVANIA.

WHEEL AND AXLE.

SPECIFICATION forming part of Letters Patent No. 419,895, dated January 21, 1890.

Application filed October 9, 1889. Serial No. 326,389. (No model.)

*To all whom it may concern:*

Be it known that I, JOHN P. SPICER, a citizen of the United States, residing at Darby, in the county of Delaware and State of Pennsylvania, have invented a new and useful Improvement in Wheels and Axles, which improvement is fully set forth in the following specification and accompanying drawings.

My invention consists in providing an axle with non-rotating thimbles or bearings, substantially as described, on which a wheel is mounted, the same serving to cause the wheel to rotate with ease and taking up the lateral strain or thrust of the wheel.

It also consists of means, substantially as described, for firmly retaining the bearings in position.

Figure 1 represents a face view, partly broken away, of a wheel and axle embodying my invention. Fig. 2 represents a longitudinal section thereof. Fig. 3 represents a perspective view of one of the bearings detached, on a reduced scale.

Similar letters of reference indicate corresponding parts in the several figures.

Referring to the drawings, A designates the hub of a wheel, preferably formed of metal, and B designates an axle, the bearing portion C whereof is squared or angular and circumscribed by thimbles or bearings D, whose bores are also squared or angular, so as to be prevented from rotating on the portion C. The outer peripheries of the thimbles are of conical form, said thimbles having their narrowest portions end to end, and the wall of the central opening of the hub being of reversed taper or conical form, so as to coincide with the exterior of the thimbles D. On the widest ends of the thimbles D are shoulders D', which abut, respectively, against the outer and inner ends of the wall of the central opening of the hub. On the end of the portion C is a nut E, which tightens against the outer thimble D, said nut being inclosed by a hollow nut F, which is screwed to the outer end of the hub. Within the hub is a chamber G, to which access is had through a duct H in the hub, the outer end of said duct being closed by a screw plug or stopper J, the duct being designed to admit oil or lubricant into the chamber G, from whence said lubricant is distributed between the thimbles and hub, thus properly lubricating the parts. Owing to the thimbles D the wheel runs with reduced friction and has a wide bearing, so that it rotates true and is well sustained, the shoulders D' receiving any lateral strain or thrust of the wheel, and thus preventing wrenching off of the wheel.

The outer end of the inner thimble D bears against a conical shoulder C' on the portion C of the axle, the same limiting the inward motion of said thimble and consequently of the wheel.

When the nut F is removed, the nut E is accessible and may also be removed. This releases the outer thimble D and permits its displacement. The wheel may now be slipped off and the inner thimble removed, the bearing portion C then being completely stripped. In order to reapply the wheel, the inner thimble is fitted on the axle or portion C, the wheel placed over said thimble, the outer thimble located within the hub, and the nuts E and F successively applied, the wheel thus being in operative position and running in the manner as hereinbefore stated. The thimbles preserve the axle from wear, and may be replaced or renewed as required.

At the base of the socket to receive the spokes, is a circumferential rib K, which is tapering or wedge-shaped in cross-section, its points being presented to the inner ends of the spokes. The sides of the socket are tapering or flaring, the widest portion being at the base, whereby when the spokes are driven into the socket their inner ends are spread apart and wedged in the socket as dovetailed joints, thus providing a strong connection for the spokes and hub.

Having thus described my invention, what I claim as new, and desire to secure by Letters Patent, is—

1. A shaft having a shoulder thereon and an angular bearing portion, conical thimbles having shoulders at their largest ends and mounted on said angular bearing, the smaller ends abutting, a hub mounted on said thimbles, a nut secured to a screw-threaded end of the shaft and bearing against the outer thimble, and an outer nut secured to the hub, said parts being combined substantially as described.

2. A shaft having the conical shoulder C' and the angular portion C, the non-rotatable conical thimbles D, with shoulders D' on said thimbles, a hub with a chambered portion and mounted on the thimbles, the nut E, secured to the shaft and bearing against one of the thimbles, and the nut F, outside of the nut E and secured to the hub, said parts being combined substantially as described.

3. An axle and a wheel, in combination with a wheel-bearing formed of non-rotating thimbles removably fitted on the axle, a nut connected with the end of the axle tightening against the thimbles, and a nut secured to the hub inclosing said axle-nut, substantially as described.

4. An axle with non-rotating thimbles D thereon and a securing-nut E, in combination with a hub having a chamber G, a duct H, and a nut F, said nut F inclosing the securing-nut E, substantially as described.

JOHN P. SPICER.

Witnesses:
JOHN A. WIEDERSHEIM,
A. P. JENNINGS.